Patented Feb. 13, 1940

2,189,908

UNITED STATES PATENT OFFICE

2,189,908

METHOD OF MANUFACTURING A SELENIUM RECTIFIER

Masatsugu Kobayashi, Juichi Osawa, and Kichiro Otake, Mita, Shibaku, Tokyo, Japan, assignors to International Standard Electric Corporation, New York, N. Y., a corporation of Delaware No Drawing. Application March 5, 1938, Serial No. 194,072. In Japan March 4, 1937

2 Claims. (Cl. 175—366)

This invention relates to new and useful improvements in the manufacture of rectifiers, photoelectric elements, and the like.

In accordance with our novel method an electrode, which is preferably of a metal belonging to the iron group, is first heated and then coated with molten selenium or selenium compound while heated to a temperature of above 270° C. The coated plate must be rapidly cooled. The rectifying or photoelectric element thus produced will be very strong and durable and have uncommonly good rectifying and current generating characteristics.

One of the requirements which must be satisfied by selenium rectifiers is that it must have low resistance to the flow of current in the positive direction and high resistance to the flow in the opposite or negative direction. In this respect selenium rectifiers were always considered inferior to cuprous oxide rectifiers.

We have found that selenium rectifiers made in accordance with our novel method have at least as good rectifying characteristics as cuprous oxide rectifiers.

It is an object of the invention to provide a process for manufacturing selenium cells, which shall result in reducing the resistance in the positive direction.

In manufacturing our selenium rectifier the surface of an iron base plate is first cleaned and a row of such base plates is placed in an electric furnace kept at a temperature preferably above 270° C. After several minutes of heating, when the base plates attain a temperature of at least 270° C., the plates are uniformly coated with selenium in molten condition. The coated plates are rapidly cooled to a temperature below 70° C. The selenium must be applied to the electrode in a molten condition so as to insure that the resistance in the positive direction be decreased as compared to elements in which the selenium is attached to the metal electrode by some other method.

The high temperature, i. e., above the melting point of selenium (220° C.), to which the metal base plate is heated, insures the firm adherence of the selenium to the plate, and perfect electrical contact throughout the surface.

Without rapid cooling the coating will not adhere firmly and the resistance in the positive direction will not be as low as required.

The selenium rectifier manufactured in accordance with the present process is strong enough so that the coating will not peel off when the element is subjected to a blow. The element has a resistance in the positive direction of about 20 ohms per square centimeter, and its average rectification ratio at 2 volts is above 5000. Furthermore, our selenium element has excellent photoelectric qualities and may be used also as a current generator.

We claim:

1. The method of manufacturing selenium cells which comprises the following steps: heating the electrode plate to a temperature above the melting point of selenium, coating the plate with molten selenium, and finally rapidly cooling the coated plate.

2. The method of manufacturing selenium rectifiers comprising the following steps: heating an iron base plate to a temperature above 270° C., coating the plate with molten selenium, and finally rapidly cooling the coated plate to 70° C.

MASATSUGU KOBAYASHI.
JUICHI OSAWA.
KICHIRO OTAKE.